(12) United States Patent
Nesori

(10) Patent No.: US 11,348,609 B2
(45) Date of Patent: May 31, 2022

(54) HEAD SUSPENSION ASSEMBLY AND DISK DEVICE

(71) Applicants: Kabushiki Kaisha Toshiba, Tokyo (JP); Toshiba Electronic Devices & Storage Corporation, Tokyo (JP)

(72) Inventor: Hirofumi Nesori, Chuo Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/174,477

(22) Filed: Feb. 12, 2021

(65) Prior Publication Data

US 2022/0076698 A1   Mar. 10, 2022

(30) Foreign Application Priority Data

Sep. 4, 2020   (JP) .............................. JP2020-148988

(51) Int. Cl.
*G11B 5/48*   (2006.01)
(52) U.S. Cl.
CPC ............ *G11B 5/4873* (2013.01); *G11B 5/483* (2015.09); *G11B 5/4853* (2013.01)
(58) Field of Classification Search
None
See application file for complete search history.

(56) References Cited

U.S. PATENT DOCUMENTS

| | | | |
|---|---|---|---|
| 8,144,436 B2 | 3/2012 | Iriuchijima et al. | |
| 8,593,765 B2 * | 11/2013 | Uematsu | G11B 5/4826 |
| | | | 360/294.4 |
| 9,105,288 B1 | 8/2015 | Hahn et al. | |
| 9,251,817 B1 * | 2/2016 | Hahn | G11B 5/483 |
| 10,957,351 B2 * | 3/2021 | Nesori | G11B 5/4813 |
| 10,984,825 B2 * | 4/2021 | Suzuki | G11B 5/484 |
| 2019/0066720 A1 * | 2/2019 | Yamada | G11B 5/4826 |
| 2020/0265866 A1 * | 8/2020 | Suzuki | G11B 5/4873 |

FOREIGN PATENT DOCUMENTS

| | | | |
|---|---|---|---|
| JP | 6133219 B2 | 5/2017 | |
| JP | 6326957 B2 | 5/2018 | |

* cited by examiner

*Primary Examiner* — William J Klimowicz
(74) *Attorney, Agent, or Firm* — Allen & Overy LLP

(57) ABSTRACT

According to one embodiment, a head suspension assembly includes a support plate, a wiring member on the support plate, a head, and a piezoelectric element on the wiring member. The wiring member includes a metal plate and a multilayered member including a first insulating layer, a conducting layer, a second insulating layer, and connection pads formed from the conducting layer. Each of the connection pads is overlaid on a recess formed in the first insulating layer, so as to form a recessed portion along the recess, and the second insulating layer includes an opening opposing each of the connection pads. The piezoelectric element is connected to the connection pads by a conductive adhesive filled in the openings and the recessed portions of the connection pads.

11 Claims, 9 Drawing Sheets

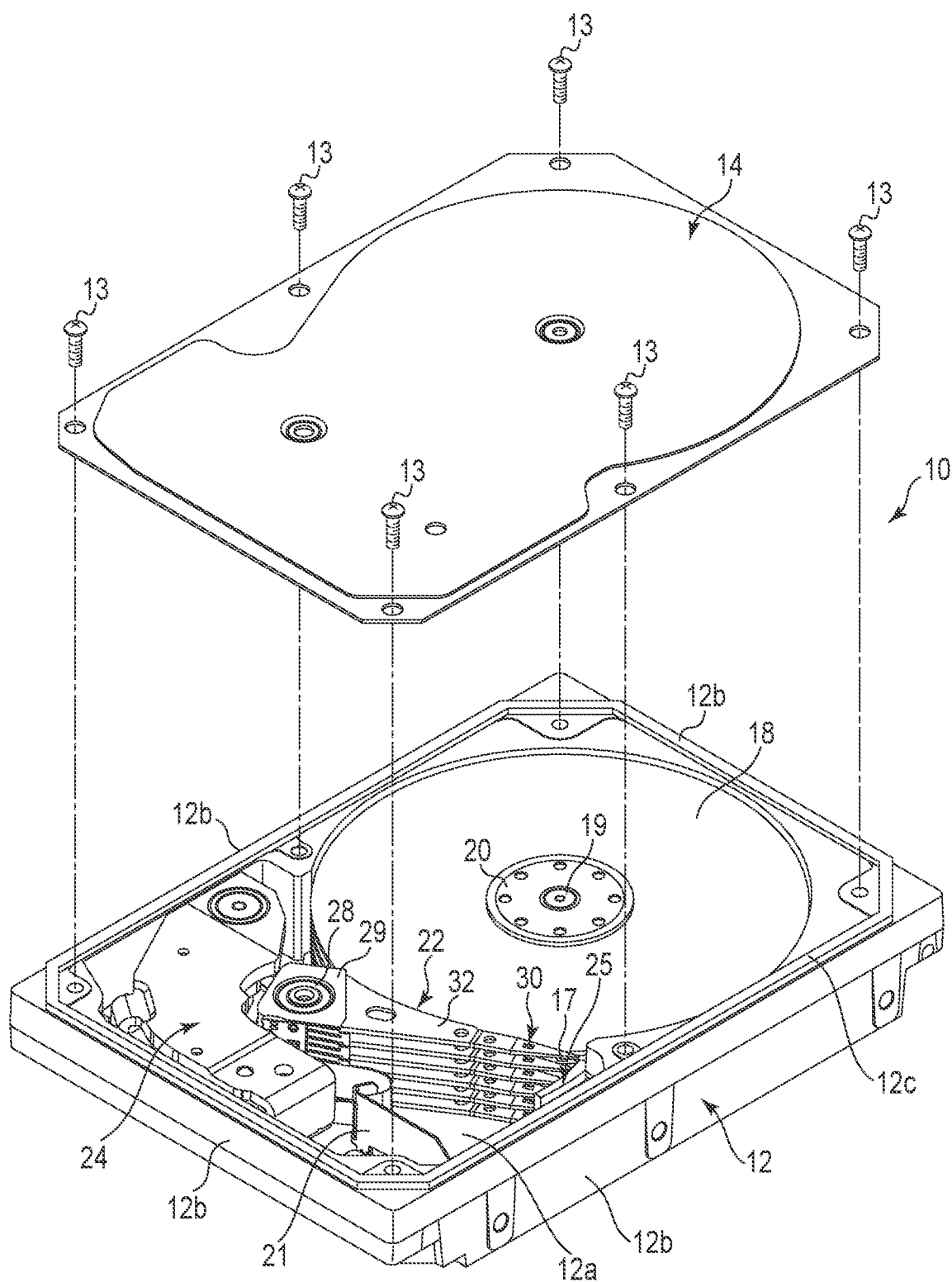
F I G. 1

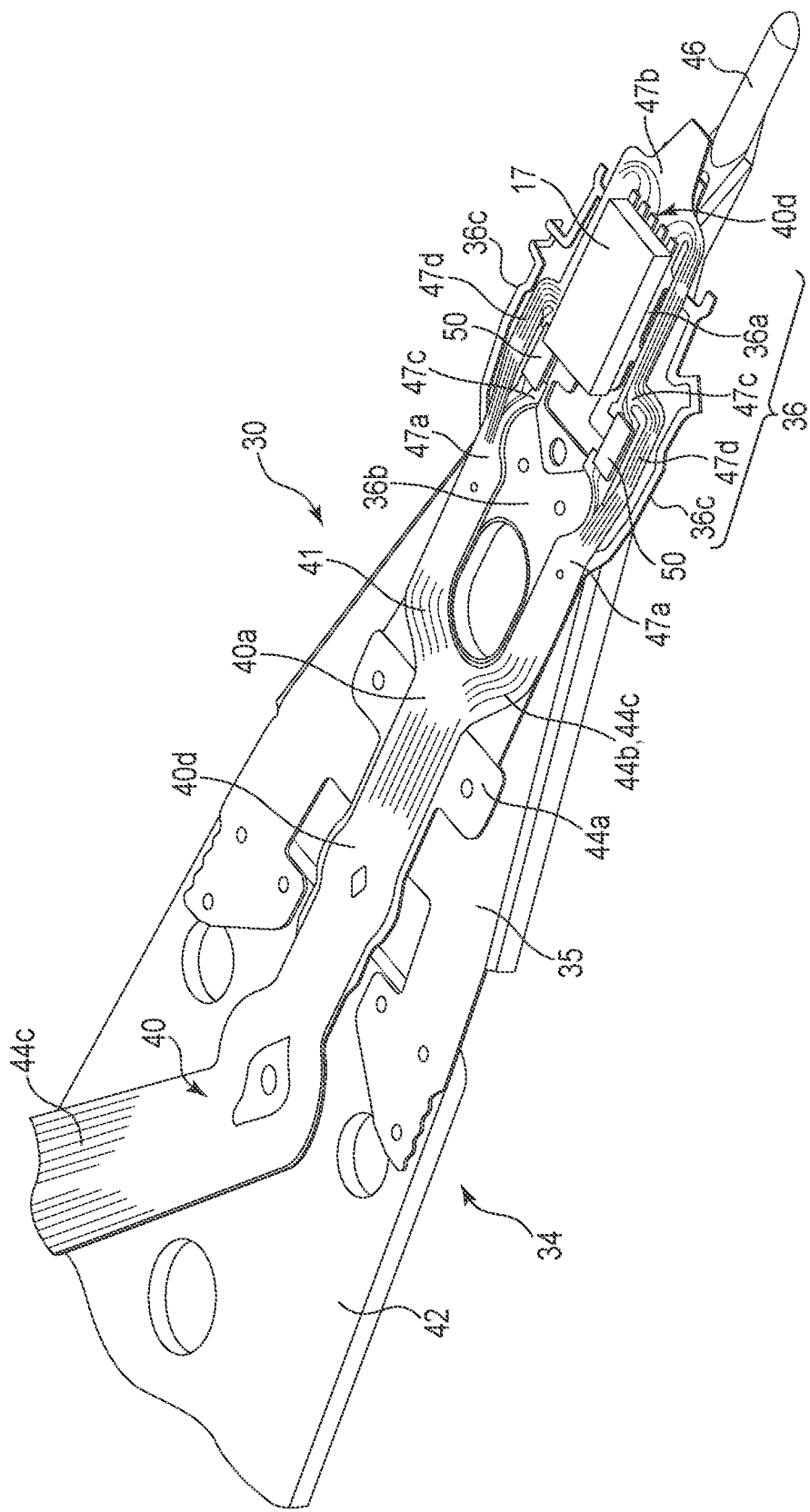
F I G. 3

HEAD SUSPENSION ASSEMBLY AND DISK DEVICE

CROSS-REFERENCE TO RELATED APPLICATIONS

This application is based upon and claims the benefit of priority from Japanese Patent Application No. 2020-148988, filed Sep. 4, 2020, the entire contents of which are incorporated herein by reference.

FIELD

Embodiments described herein relate generally to a head suspension assembly and a disk device comprising the same.

BACKGROUND

As disk devices, for example, hard disk drives (HDDs) comprise a plurality of magnetic disks disposed rotatably in a housing, a plurality of magnetic heads which carry out read and write of data with respect to the respective magnetic disks, and a head actuator which supports the magnetic heads movably with respect to the respective magnetic disks.

The head actuator comprises a plurality of head suspension assemblies which supporting, by distal ends thereof, the respective magnetic heads. The head suspension assemblies each include a base plate, one end of which is fixed to a respective arm, a load beam extending from the base plate and a flexure (wiring member) provided on the load beam and the base plate. The flexure includes a displaceable gimbal portion and each magnetic head is supported on the respective gimbal portion.

Recently, a head suspension assembly including a piezoelectric element which constitutes a microactuator has been proposed. The piezoelectric element is mounted on the flexure. An electrode of the piezoelectric element is electrically and mechanically connected to a conductor pattern of the flexure, that is, for example, a conductive pad by, for example, a conductive adhesive.

In the HDD described above, the piezoelectric element is placed on the conductive adhesive applied onto the flexure and is joined to the conductive pad by melting the conductive adhesive by heating. Here, it is necessary to apply a sufficient amount of adhesive for securing of the strength of bonding and the conductivity. However, if applied excessively, the adhesive is wet-spread, thereby causing electrical short-circuiting and a mechanical effect in some cases. In such cases, the head suspension assembly is handled as a defective.

BRIEF DESCRIPTION OF THE DRAWINGS

FIG. 1 is an exploded perspective view of a hard disk drive (HDD) according to a first embodiment.

FIG. 3 is a perspective diagram showing the head suspension assembly.

DETAILED DESCRIPTION

Figure 2:
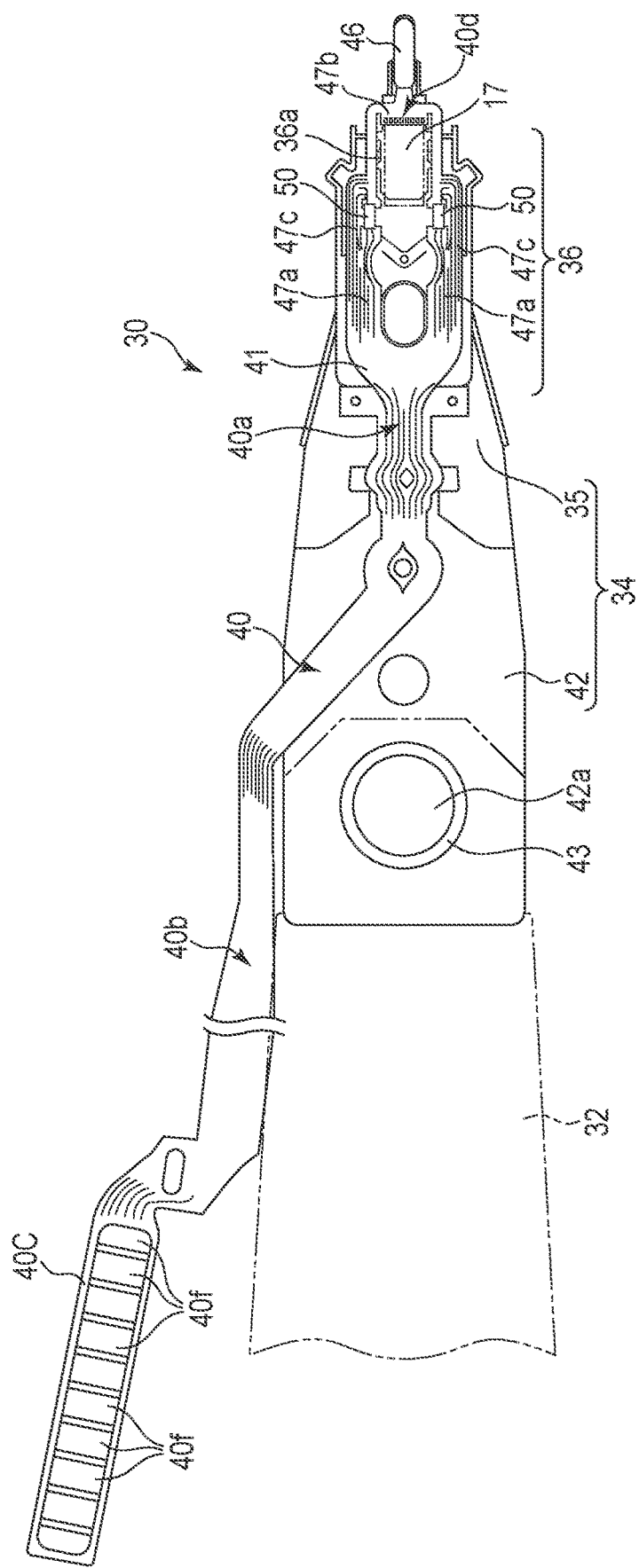
FIG. 2 is a plan view of a head suspension assembly of the HDD.

Various embodiments will be described hereinafter with reference to the accompanying drawings. In general, according to one embodiment, a head suspension assembly comprises a support plate; a wiring member disposed on the support plate; a head mounted on the wiring member; and an expandable/contractable piezoelectric element mounted on the wiring member. The wiring member comprises: a metal plate fixed to the support plate; and a multilayered member comprising a first insulating layer, a conducting layer stacked on the first insulating layer, a second insulating layer stacked on the first insulating layer and the conducting layer, the conductive layer including at least two of connection pads and a plurality of wiring lines connected to the pair of connection pads. Each of the connection pads is overlaid on a recess formed in the first insulating layer, so as to form a recessed portion along the recess, and the second insulating layer comprises an opening opposing each of the connection pads. The piezoelectric element is connected to the connection pads by a conductive adhesive filled in the openings and the recessed portions of the connection pads.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

As a disk device, a hard disk drive (HDD) according to a first embodiment will be described in detail.

FIG. 1 is an exploded perspective view showing the HDD according to the first embodiment, when a cover is removed. As shown in FIG. 1, the HDD comprises a rectangular shaped housing 10. The housing 10 includes a rectangular box-shaped base 12 with an upper opening and a cover (top cover) 14. The base 12 includes a rectangular bottom wall 12a and side walls 12b formed to stand along edges of the bottom wall 12a, which are formed to be integrated together as one body from, for example, aluminum. The cover 14 is formed, for example, into a rectangular plate shape from stainless steel. The cover 14 is screwed on the side walls 12b of the base 12 with a plurality of screws 13 so as to air-tightly close the upper opening of the base 12.

In the housing 10 are provided a plurality of disk-shaped magnetic recording media, for example, five magnetic disks 18, and a spindle motor 19 which supports and rotate the magnetic disks 18. The spindle motor 19 is disposed on the bottom wall 12a.

The magnetic disks 18 are each formed into a disk having a diameter of 95 mm (3.5 inches), and include, for example, a magnetic recording layer formed on an upper surface and/or a lower surface thereof. The magnetic disks 18 are engaged coaxially each other with a hub of the spindle motor 19 (not shown), and further clamped by a clamp spring 20 to be fixed to the hub. Thus, the magnetic disks 18 are supported to be placed parallel to the bottom wall 12a of the base 12. The magnetic disks 18 are rotated at a predetermined number of revolutions by the spindle motor 19.

Note that in this embodiment, there are five magnetic disks 18 installed in the housing 10, but the number of magnetic disks 18 is not limited to five, but may be increased or decreased. Or a single magnetic disk 18 may be installed in the housing 10.

In the housing 10 are provided a plurality of magnetic heads 17 (see FIG. 2) for recording/reproducing data with respect to the magnetic disks 18 and a head actuator 22 which supports the magnetic heads 17 to be movable with respect to the respective magnetic disks 18. The HDD further comprises a voice coil motor (VCM) 24 which rotates and positions the head actuator 22, a ramp load mechanism 25 which hold the magnetic heads 17 at an unload position spaced apart from the respective magnetic disk 18 when the magnetic head 17 moves to the outermost circumference of the magnetic disk 18, and a substrate unit (FPC unit) 21 on which electronic components such as conversion connectors are mounted.

The head actuator 22 includes an actuator block 29 in which a bearing unit is built, a plurality of arms 32 each extending from the actuator block 29 and suspension assemblies 30, (which may be referred to as head gimbal assemblies (HGA), hereinafter) extending from the respective arms 32. Each magnetic head 17 is supported on a distal end portion of the respective suspension assembly 30. The head actuator 22 is rotatably supported to a pivot shaft set to stand on the bottom wall 12a via a unit bearing 28.

To an outer surface of the bottom wall 12a, a printed circuit board (not shown) is screwed. A controller is constituted on the printed circuit board, and the controller controls operation of the spindle motor 19 and controls operation of the VCM 24 and the magnetic heads 17 via the substrate unit 21.

Next, the structure of the suspension assembly 30 will be described in detail.

FIG. 2 is a plan view of the suspension assembly, and FIG. 3 is a perspective diagram showing the suspension assembly.

As shown in FIGS. 2 and 3, each suspension assembly 30 includes a suspension 34 extending from the respective arm 32, and the respective magnetic head 17 is mounted on the distal end portion of the suspension 34. Note that a set of the magnetic head 17 and the suspension assembly 30 which support the head is referred to as a head suspension assembly.

The suspension 34 which functions as a support plate includes a rectangular base plate 42 formed from a metal plate having a thickness of several hundred micrometers and a slender leaf spring-shaped load beam 35 formed from a metal plate having a thickness of several tens of micrometers. The load beam 35 is fixed to the base plate 42 in the following manner. That is, a proximal end portion thereof is stacked on the distal end portion of the base plate 42, and then welded thereto at a plurality of locations. The width of the proximal end portion of the load beam 35 is substantially equal to the width of the base plate 42. A rod-shaped tab 46 is provided at a distal end of the load beam 35 so as to project therefrom.

The base plate 42 comprises a circular opening 42a in a proximal end portion thereof and an annular protruding portion 43 located around the opening 42a. The base plate 42 is fastened to a distal end portion of the arm 32 as the protruding portion 43 is engaged with a circular caulking hole (not shown) formed in a calking seat of the arm 32, and the protruding portion 43 is caulked. The proximal end of the base plate 42 may be fixed to the distal end of the arm 32 by laser welding, spot welding or adhesion.

The suspension assembly 30 includes a slender belt-shaped flexure (wiring member) 40 which transmit recording and reproduction signals and a driving signal of piezoelectric elements 50, and a pair of piezoelectric elements (for example, PZT elements) 50 mounted on the flexure 40. As shown in FIG. 2, the flexure 40 extends along a side edge of the arm 32 as a distal end side portion 40a is placed on the load beam 35 and the base plate 42 and a latter half portion (extending portion) 40b extends outward from a side edge of the base plate 42. A connecting end portion 40c located in a distal end of the extending portion 40b comprises a plurality of connection pads 40f. The connection pads 40f are connected to the main FPC of the substrate unit 21 described above.

The distal end portion of the flexure 40 is located on the distal end portion of the load beam 35, and constitutes a gimbal portion 36 functioning as an elastic supporting member. The magnetic head 17 is placed and fixed on the gimbal portion 36 and is supported by the load beam 35 via the gimbal portion 36. The pair of piezoelectric elements 50 as the driving elements are mounted on the gimbal portion 36 and are located on a proximal end side of the load beam 35 with respect to the magnetic head 17.

Figure 4:
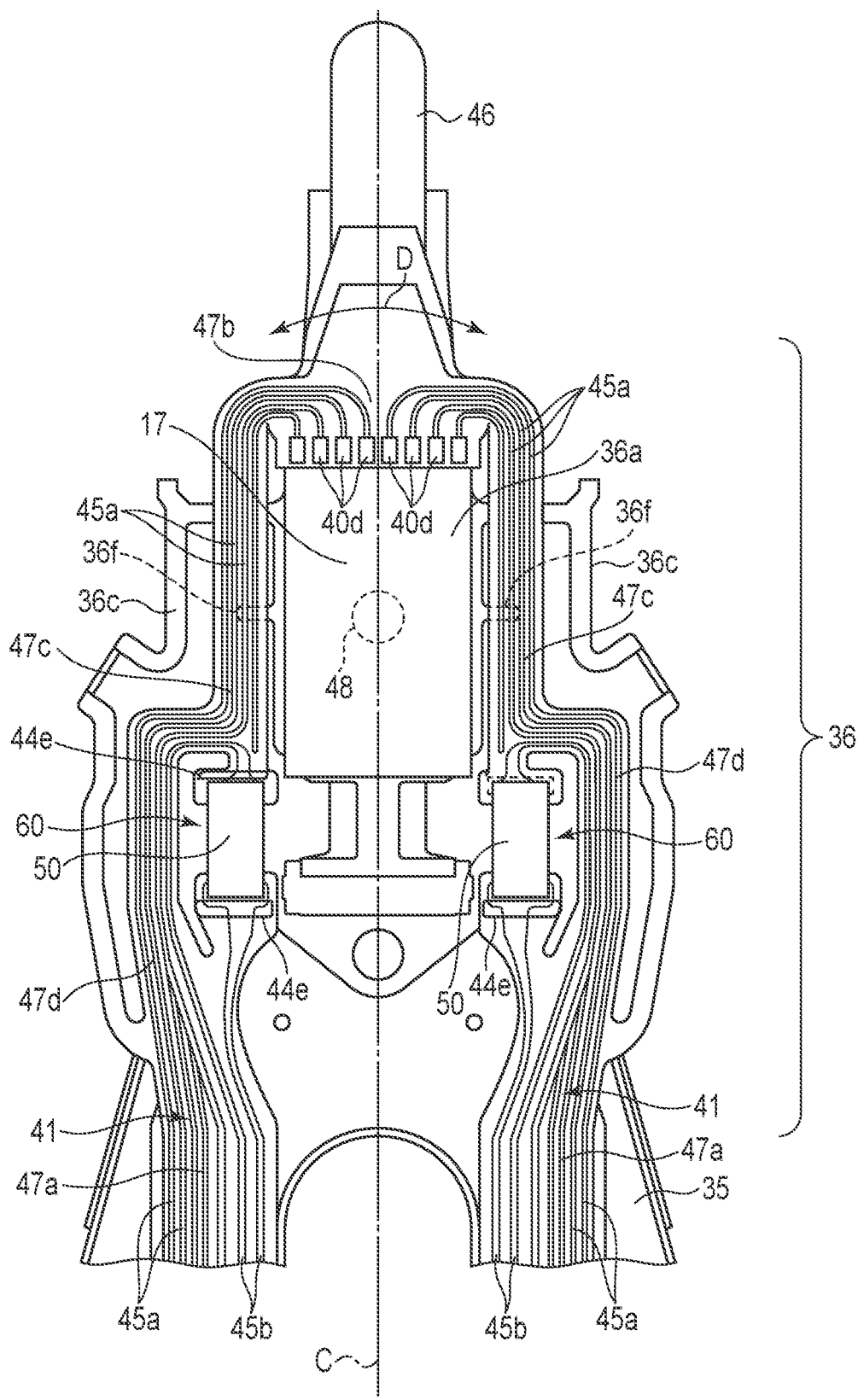
FIG. 4 is an enlarged plan view showing a distal end portion of the head suspension assembly.

FIG. 4 is an enlarged plan view showing the distal end portion of the suspension assembly 30.

As shown in FIGS. 3 and 4, the flexure 40 comprises a metal thin plate (metal plate) 44a such as of stainless steel, which a base, and a belt-shaped multi-layered member 41 adhered and fixed on the metal thin plate 44a, which make a slender multilayered plate. The multilayered member 41 includes a base insulating layer (a first insulating layer) 44b, a most portion of which is fixed to the metal thin plate 44a, a conducting layer (wiring pattern) 44c formed on the base insulating layer 44b and constituting a plurality of signal wiring lines 45a and drive wiring lines 45b and a plurality of connection pads, and a cover insulating layer (a second insulating layer) 44d (see FIG. 7) stacked on the base insulating layer 44b to cover the conducting layer 44c. As the conducting layer 44c, for example, a copper foil can be used. In the distal end-side portion 40a of the flexure 40, the metal thin plate 44a is attached on surfaces of the load beam 35 and the base plate 42, or is spot-welded at a plurality of welding points.

In the gimbal portion 36 of the flexure 40, the metal thin plate 44a includes a rectangular tongue portion (a support member) 36a located in the distal end side, a substantially rectangular proximal end portion (proximal end plate portion) 36b located in the proximal end side so as to oppose the tongue portion 36a interposing a space therebetween, a pair of outriggers (link portions) 36c extending from the tongue portion 36a to the proximal end portion 36b and a pair of handles (supporting projections) 36f projecting from respective side edges of the tongue portion 36a to the respective sides.

The proximal end portion 36b is adhered on the surface of the load beam 35, or fixed on the surface of the load beam 35 by spot welding. The tongue portion 36a is formed to have such size and shape that the magnetic head 17 can be placed, that is, for example, substantially rectangular. The tongue portion 36a is placed so that a central axis in its width direction coincides with a central axis C of the suspension 34. Further, the tongue portion 36a abuts, by substantially a central portion thereof, against a dimple (projecting portion) 48 projecting from the distal end portion of the load beam 35. The tongue portion 36a is deformable in various directions as the pair of outriggers 36c elastically deform. Thus, the tongue portion 36a and the magnetic head 17 flexibly follows the displacement of the surface of the magnetic disk 18 to rolling and pitching directions, thereby making it possible to maintain a microclearance between the surface of the magnetic disk 18 and the magnetic head 17.

In the gimbal portion 36, a part of the multilayered member 41 of the flexure 40 is branched out into two, which are located on respective sides of the central axis C of the suspension 34. The multilayered member 41 includes a proximal end portion 47a fixed to a proximal end portion 36b of the metal thin plate 44a, a distal end portion 47b attached on the tongue portion 36a, a pair of belt-shaped first bridge portion 47c extending from the proximal end portion 47a to the distal end portion 47b, a pair of belt-shaped second bridge portions 47d respectively extending along the first bridge portions 47c from the proximal end portion 47a to middle portions of the first bridge portions 47c and respectively joining to the first bridge portions 47c. The first bridge portions 47c are located along the outriggers 36c respectively on the respective sides of the tongue portion 36a, and extend in a longitudinal direction of the load beam 35. Further, the first bridge portions 47c each extend on the respective handle 36f and outrigger 36c, and are partially fixed to these. A part of each first bridge portion 47c constitutes a mounting portion 60 on which the piezoelectric element 50 is mounted.

The magnetic head 17 is fixed to the tongue portion 36a with an adhesive. The magnetic head 17 is disposed so that a longitudinal substantial central axis thereof coincides with a central axis of the suspension 34 and also a substantial center of the magnetic head 17 is located on the dimple 48. The recording element and reproduction element of the magnetic head 17 are electrically connected to a plurality of electrode pads 40d of the distal end portion 47b with a conductive adhesive such as solder, silver paste or the like. Thus, the magnetic head 17 is connected to the signal wiring lines 45a via the electrode pads 40d.

Figure 5:
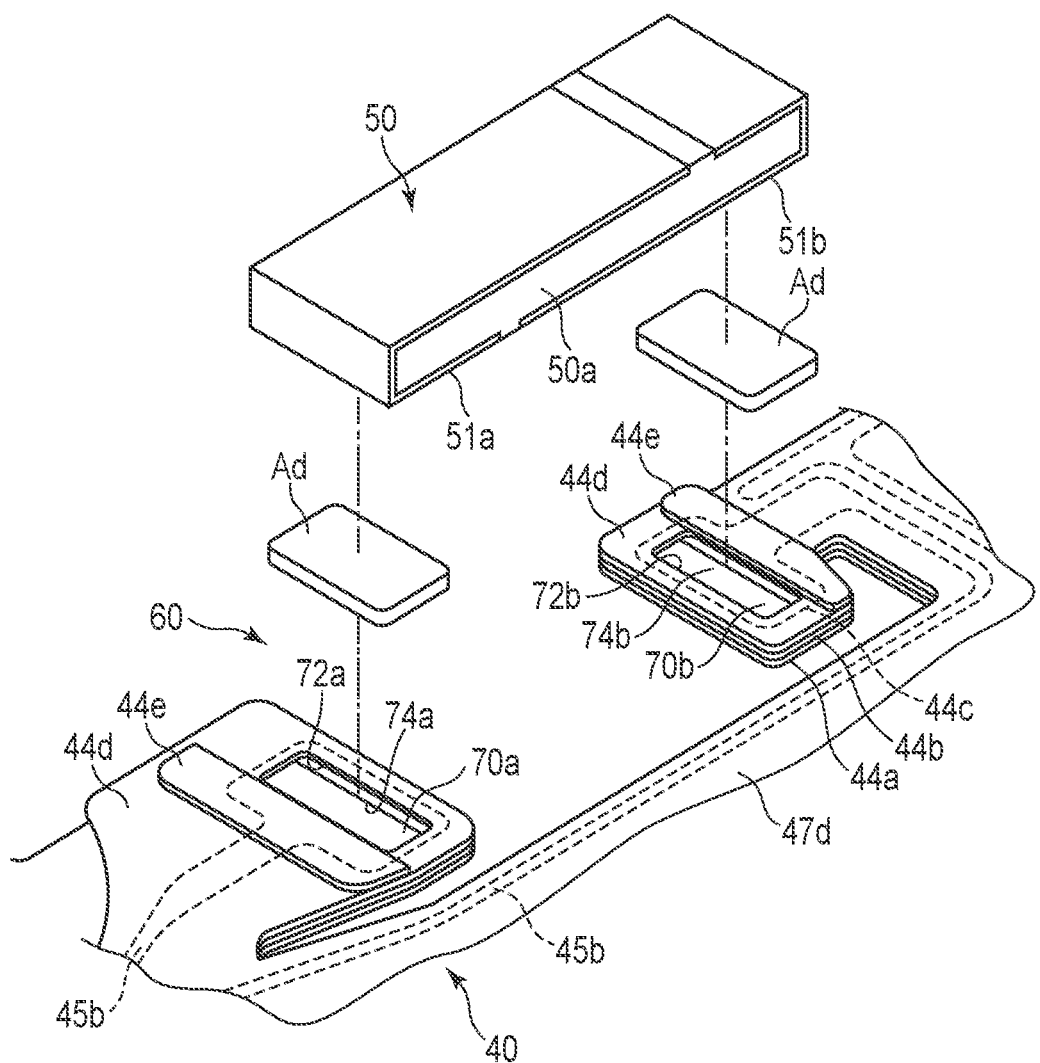
FIG. 5 is an exploded perspective view showing a piezoelectric element and a pad portion of a flexure of the head suspension assembly.
Figure 6:
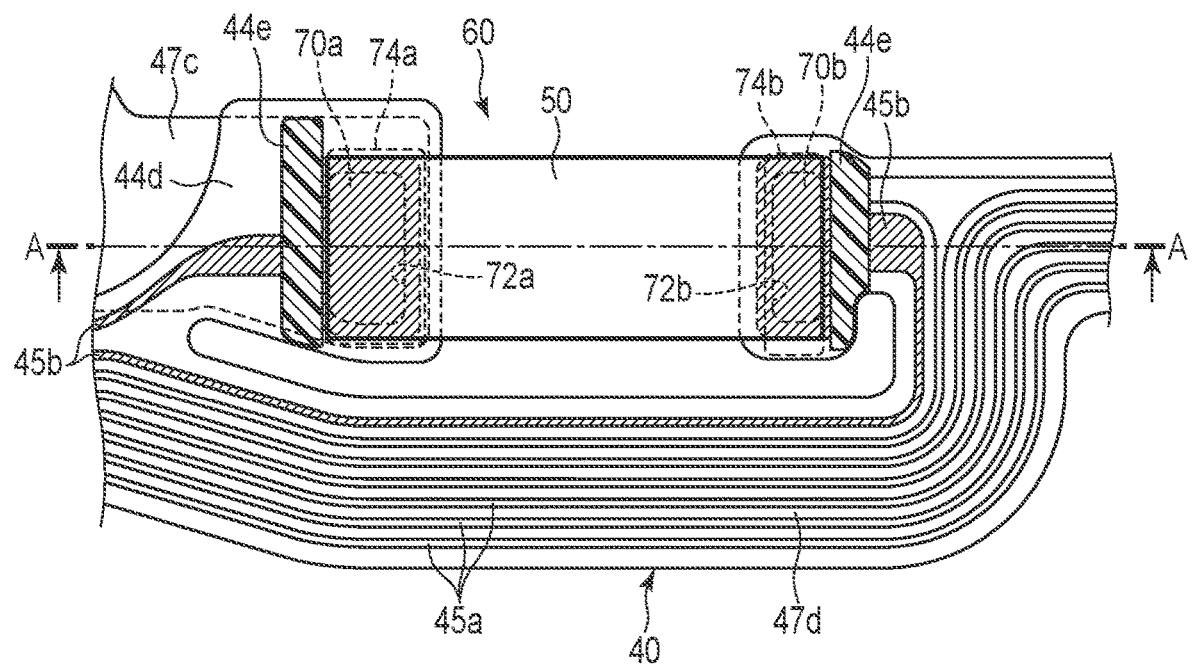
FIG. 6 is a plan view showing the pad portion of and the piezoelectric element the flexure.

The mounting portion 60 and the piezoelectric element 50 will now be described in detail. FIG. 5 is an exploded perspective view showing the mounting portion and the piezoelectric element of the flexure 40. FIG. 6 is a plan view showing the mounting portion on which the piezoelectric element is mounted, and FIG. 7 is a cross-sectional view of the mounting portion and the piezoelectric element, taken along line A-A in FIG. 6.

As shown in FIG. 5, the mounting portion 60 includes a first connection pad 70a and a second connection pad 70b, each formed from a conducting layer 44c. The first connection pad 70a and the second connection pad 70 are electrically connected to the drive wiring lines 45b each formed from the conducting layer 44c. The first connection pad 70a and the second connection pad 70b are arranged at a predetermined interval in a direction parallel to the central axis C of the load beam 35. In this present embodiment, the first bridge portion 47c of the flexure 40 includes a physical gap between the first connection pad 70a and the second connection pad 70b. Thus, the first connection pad 70a and the second connection pad 70b are arranged with a space of a predetermined length interposed therebetween.

Figure 7:
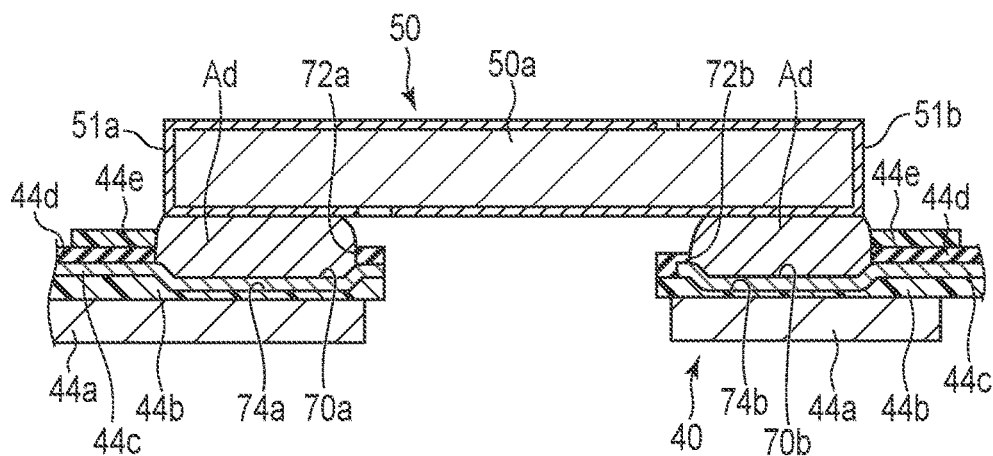
FIG. 7 is a cross-sectional view of the pad portion and the piezoelectric element, taken along line A-A in FIG. 6.

As shown in FIGS. 5 to 7, in a position overlapping the first connection pad 70a, a rectangular recess 74a is formed in the base insulating layer 44b. The recess 74a is formed by, for example, half-etching a predetermined site of the base insulating layer 44b. The recess 74a is formed into a rectangular shape with dimensions slightly larger than those of the first connection pad 70a. The first connection pad 70a is formed to be lied on the recess 74a and recessed along the recess 74a, thus forming a recess.

In a position overlapping the second connection pads 70b, a rectangular recess 74b is formed in the base insulating layer 44b. The recess 74b is formed by, for example, half-etching a predetermined side of the base insulating layer 44b. The recess 74b is formed into a rectangular shape with dimensions slighter larger than those of the second connection pad 70b. The second connection pads 70b is formed to be overlaid on the recess 74a and is recessed along the recess 74a, thus forming a recess.

Note that the number of each of the recesses 74a and 74b of the base insulating layer 44b is not singular to a connection pad, but there may be a plurality of recesses provided for one connection pad. The shape of the recesses 74a and 74b is not limited to rectangular but may be selected from various ways.

In the cover insulating layer 44d stacked on the conducting layer 44c, openings 72a and 72b are made in respective positions overlapping the first connection pad 70a and the second connection pad 70b. The most of the first connection pad 70a and the most of the second connection pad 70b are respectively exposed through the openings 72a and 72b to an outer surface of the cover insulating layer 44d. For example, the first connection pad 70a and the second connection pad 70b are each formed into a rectangular shape, and similarly, the openings 72a and 72b are each formed into a rectangular shape with slightly less dimensions than those of the connection pads.

In the vicinity of the opening 72a, a second cover layer 44e is provided on the cover insulating layer 44d. The second cover layer 44e is provided on a side of the drive wiring lines 45b with respect to the opening 72a, that is, an opposite side to the second connection pad 70b. For example, the second cover layer 44e is formed into substantially a rectangular shape, and the first bridge portion 47c expands over substantially the entire width of the conductive adhesive. As will be discussed later, the second cover layer 44e functions as a dam which regulates the spreading of the conductive adhesive.

Similarly, in the vicinity of the opening 72b, a second cover layer 44e is provided on the cover insulating layer 44d. The second cover layer 44e is provided on a side of the drive wiring lines 45b with respect to the opening 72b, that is, on an opposite side to the first connection pad 70a. For example, the second cover layer 44e is formed into substantially a rectangular shape, and extends over substantially the entire width of the first bridge portion 47c. As will be discussed later, the second cover layer 44e functions as a dam which regulates the spreading of the conductive adhesive.

For example, the second cover layers 44e are formed to have substantially the same thickness as that of the cover insulating layer 44d and is formed of the same insulating material as that of the cover insulating layer 44d. Note that the shape of the second cover layer 44e is not limited to rectangular, but may be selected from any shapes. The second cover layers 44e may be provided to be slightly spaced apart from the openings 72a and 72b.

The piezoelectric element 50 as a driving element, includes, for example, a flat rectangular parallelepiped piezoelectric main body 50a formed from a piezoelectric material and a first electrode 51a and a second electrode 51b provided on an outer surface of the piezoelectric main body 50a. Usable examples of the piezoelectric material are zinc zirconic titanate and ceramic.

The first electrode 51a is provided from one end of the lower surface of the piezoelectric body 50a over the most of a short edge-side lateral surface and the upper surface thereof. The second electrode 51b is provided from one end of the upper surface of the piezoelectric body 50a over the most of the short edge-side lateral surface and the lower surface thereof. In the lower surface of the piezoelectric body 50a, one end of the first electrode 51a and one end of the second electrode 51b oppose each other with an interval therebetween. In the upper surface of the piezoelectric body 50a, the other end of the first electrode 51a and the other end of the second electrode 51b oppose each other with an interval therebetween.

When voltage is applied between the first electrode 51a and the second electrode 51b, the piezoelectric main body 50a interposed between the first electrode 51a and the second electrode 51b expands or shrinks in longitudinal directions. For example, the first electrode 51a is an electrode on a voltage-applied (Vin) side, and the second electrode 51b is an electrode on a ground (GND) side.

As shown in FIGS. 5 to 7, the piezoelectric element 50 is placed on the mounting portion 60 in the state where one longitudinal end (the first electrode 51a) of the piezoelectric main body 50a opposes the first connection pad 70a, and the other longitudinal end (the second electrode 51b) thereof opposes the second connection pad 70b. Between the first connection pad 70a and the first electrode 51a, a conductive adhesive Ad is filled. Usable examples of the conductive adhesive are silver paste, solder, and the like. The first electrode 51a is electrically and mechanically connected to the first connection pad 70a by the conductive adhesive Ad. Here, the conductive adhesive Ad is filled in the opening 72a of the cover insulating layer 44d and a recess (recessed portion) of the first connection pad 70a, formed along the recess 74a and is adhered onto the surface of the first connection pads 70a and an inner surface (the cover insulating layer 44d) of the opening 72a. Further, the conductive adhesive Ad is adhered to an end edge of the second cover layer 44e, and at the same time, it is stopped and regulated by the second cover layer 44e from leaking to the side of the drive wiring lines 45b.

When the microactuator is in operation, a drive voltage is applied to the first electrode 51a via the drive wiring lines 45b, the first connection pad 70a and the conductive adhesive Ad.

Similarly, the conductive adhesive Ad is filled between the second connection pad 70b and the second electrode 51b. The second electrode 51b is electrically and mechanically connected to the second connection pad 70b by the conductive adhesive Ad. Here, the conductive adhesive Ad is filled in the opening 72b of the cover insulating layer 44d and a recess (recessed portion) of the second connection pad 70b, made along the recess 74b and is adhered onto the surface of the second connection pad 70b and an inner surface (the first cover insulating layer 44d) of the opening 72b. Further, the conductive adhesive Ad is adhered to an edge of the second cover layer 44e, and at the same time, it is stopped and regulated by the second cover layer 44e from leaking to the side of the drive wiring lines 45b.

In the HDD configured as described above, when a voltage (driving signal) is applied to the piezoelectric element 50 via the drive wiring lines 45b, the piezoelectric element 50 expands and contracts in its longitudinal direction (the direction parallel to the central axis C of the suspension). As indicated by an arrow D in FIG. 4, two piezoelectric elements 50 are driven so as to respectively expand and contract in reverse directions from each other, the pair of first bridge portions 47c are respectively stroked in reverse directions from each other. The first bridge portions 47c swing the tongue portion 36a of the gimbal portion 36 and the magnetic head 17 around the dimple 48 in direction of the arrow D via the handle 36f. Thus, by the expansion and contraction of the piezoelectric element 50, the magnetic head 17 can be minutely displaced. Note that the swing direction D of the magnetic head 17 is equivalent to a seeking direction (a cross-track direction) of the magnetic head 17 on the respective magnetic disk 18.

According to this embodiment, in the mounting portion 60 of the flexure 40 on which the piezoelectric element 50 is mounted, the first connection pad 70a and the second connection pad 70b are formed respectively on the recesses 74a and 74b made in the base insulating layer 44b, so as to make the connection pads into a recessed shape, and thus the adhesive Ad can be sufficiently contained and kept on the connection pads 70a and 70b. With this structure, even if a just sufficient amount of the adhesive Ad to avoid lacking thereof and to secure the strength of adhesion and conductivity, it is possible to prevent the adhesive Ad from wet-spreading to the side of the drive wiring lines. At the same time, the contact area between the adhesive Ad and the connection pads 70a and 70b increases, and also a high anchor effect can be obtained by the recesses. Therefore, the strength of adhesion of the adhesive Ad to the connection pads is further improved.

Further, according to this embodiment, the second cover layer 44e functioning as a dam is provided in the peripheral portions of the connection pads 70a and 70b, and with this structure, the second cover layers 44e can stop the conductive adhesive Ad, thereby making it possible to further reliably prevent the leakage thereof to the side of the drive wiring lines 45b. Thus, the electrical short-circuiting and the mechanical effect, which may be caused by the wet-spreading of the conductive adhesive can be avoided, thereby improving the product yield of the device.

As described above, according to the present embodiment, a head suspension assembly and a disk device, with high connection strength of the piezoelectric element and improved reliability, can be obtained.

Next, head suspension assemblies of HDDs according to other embodiments will be described. In the other embodiments to be described below, portions equivalent to those of the first embodiment are denoted by the same reference numbers and detailed explanation thereof is omitted or simplified.

Second Embodiment

Figure 8:
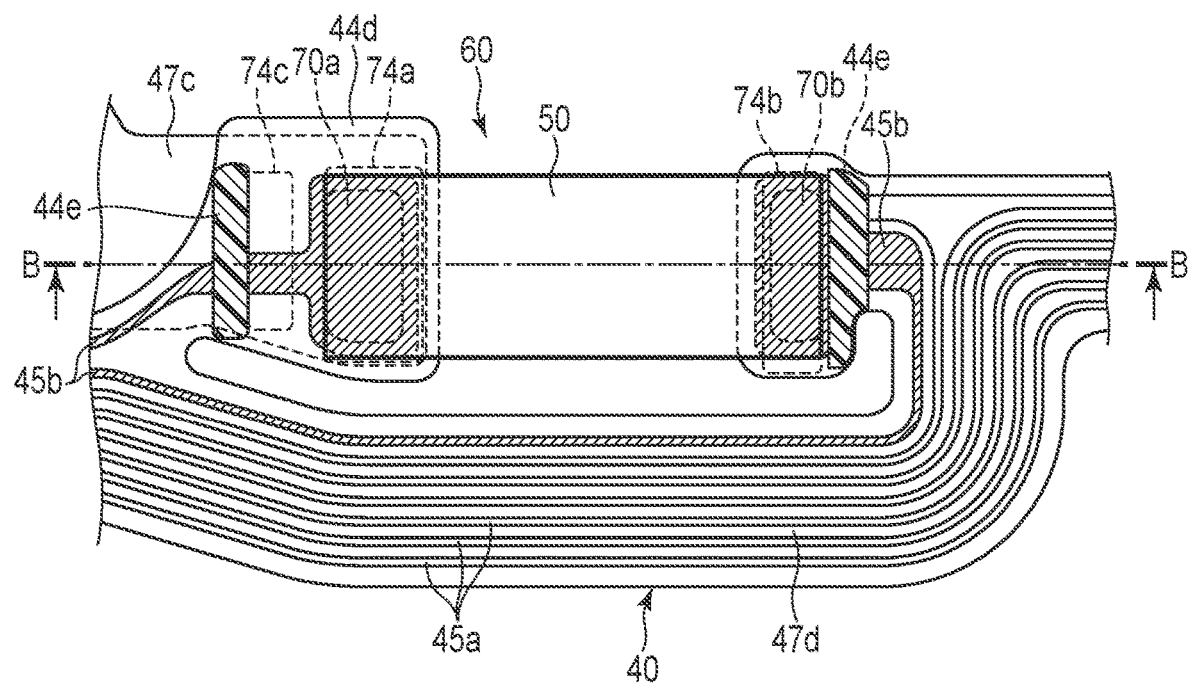
FIG. 8 is a plan view showing a pad portion and a piezoelectric element of an HDD according to a second embodiment.
Figure 9:
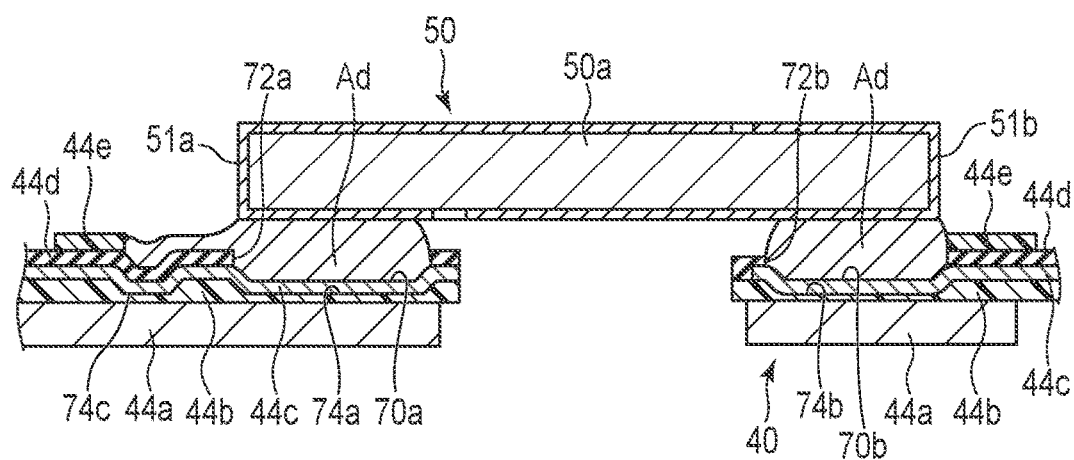
FIG. 9 is a cross-sectional view of the pad portion and the piezoelectric element, taken along line B-B in FIG. 8.

FIG. 8 is a plan view of a mounting portion of a head suspension assembly according to a second embodiment, on which a piezoelectric element is mounted, and FIG. 9 is a cross-sectional view of the mounting portion and the piezoelectric element, taken along line B-B in FIG. 8.

As shown, in the mounting portion 60 of the flexure 40, the base insulating layer 44b further comprises a second recess 74c provided in the vicinity of at least one of the first connection pad 70a and the second connection pad 70b. According to the second embodiment, the second recess 74c is provided on a side of the drive wiring lines 45b with respect to the first connection pad 70a, that is, an opposite side to the second connection pad 70b, in the vicinity of the first connection pad 70a. For example, the second recess 74c is formed into a rectangular shape and is arranged substantially parallel to the recess (a first recess) 74a with a gap therebetween. The second recess 74c has a length substantially equal to that of the recess 74a and a width about a half of that of the recess 74a. The second recess 74c is formed by, for example, half-etching a predetermined site of the base insulating layer 44b.

Note that the number of the second recesses 74c of the base insulating layer 44b is not limited to singular, but there may be recesses divided into plural. The shape of the second recess 74c is noted limited to rectangular, but may be selected from various ways.

The conducting layer 44c (the drive wiring lines 45b) and the cover insulating layer 44d are formed to be overlaid on the second recess 74c, and the overlaying region is recessed along the second recess 74c, thus forming a recessed portion.

According to the second embodiment, the second cover layer 44e is provided on the cover insulating layer 44d in the vicinity of the second recess 74c. The second cover layer 44e is provided on an opposite side to the first connection pad 70a with respect to the second recess 74c. The second cover layer 44e is formed into, for example, a rectangular shape, and extends along one side edge of the second recess 74c and over substantially the entire width of the first bridge portion 47c. The second cover layer 44e functions as a dam which regulates the spreading of the conductive adhesive.

For example, the second cover layers 44e are formed to have substantially the same thickness as that of the cover insulating layer 44d and are formed of the same insulating material as that of the cover insulating layer 44d. Note that the shape of the cover layers 44e is noted limited to rectangular, but may be selected from various ways.

In the mounting portion 60, the recess 74b on the side of the second connection pad 70b and the second cover layer 44e have structures similar to those of the first embodiment previously described, but such a structure may as well do that the second recess is further provided as in the case of the first connection pad 70a side, and the second cover layer 44e is provided in the vicinity of the second recess.

The piezoelectric element 50 is placed on the mounting portion 60 in the state where one longitudinal end (the first electrode 51a) of the piezoelectric main body 50a opposes the first connection pad 70a, and the other longitudinal end (the second electrode 51b) thereof opposes the second connection pad 70b. Between the first connection pad 70a and the first electrode 51a, a conductive adhesive Ad is filled. Usable examples of the conductive adhesive are silver paste, solder, and the like. The first electrode 51a is electrically and mechanically connected to the first connection pad 70a by the conductive adhesive Ad. The conductive adhesive Ad is filled between the first connection pad 70a and the first electrode 51a. The first electrode 51a is electrically and mechanically connected to the first connection pad 70a by the conductive adhesive Ad. Here, the conductive adhesive Ad is filled in an opening 72a of the cover insulating layer 44d and a recess (recessed portion) of the first connection pad 70a, formed along the recess 74a and is adhered on the surface of the first connection pad 70a and the inner surface (the cover insulating layer 44d) of the opening 72a. A part of the conductive adhesive Ad flows on the cover insulating layer 44d and it is filled in the recess of the cover insulating layer 44d, which corresponds to the second recess 74c. Further, the conductive adhesive Ad is adhered in the end edge of the second cover layer 44e, and at the same time, it is stopped and regulated by the second cover layer 44e from leaking to the side of the drive wiring lines 45b.

The conductive adhesive Ad is filled between the second connection pad 70b and the second electrode 51b. The second electrode 51b is electrically and mechanically connected to the second connection pad 70b by the conductive adhesive Ad. Here, the conductive adhesive Ad is filled in the opening 72a of the cover insulating layer 44d and a recess (recessed portion) of the second connection pad 70b, recessed along the recess 74b and is adhered onto the surface of the second connection pad 70b and an inner surface (the cover insulating layer 44d) of the opening 72b. Further, the conductive adhesive Ad is adhered to an end edge of the second cover layer 44e, and at the same time, it is stopped and regulated by the second cover layer 44e from leaking to the side of the drive wiring lines 45b.

According to the head suspension assembly of the HDD of this embodiment configured as described above, in the mounting portion 60 of the flexure 40 on which the piezoelectric element 50 is mounted, the first connection pad 70a and the second connection pad 70b are formed respectively on the recesses 74a and 74b made in the base insulating layer 44b, so as to make the connection pads into a recessed shape, and thus the adhesive Ad can be sufficiently contained and kept on the connection pads 70a and 70b. With this structure, even if a just sufficient amount of the adhesive Ad to avoid lacking thereof and to secure the strength of adhesion and conductivity, it is possible to prevent the adhesive Ad from wet-spreading to the side of the drive wiring lines. In the side of the first connection pad 70a, a part of the conductive adhesive Ad flows on the cover insulating layer 44d and it is filled in the recess of the cover insulating layer 44d, which corresponds to the second recess 74c. Therefore, even if a more amount of conductive adhesive Ad is filled on the side of the first connection pad 70a, it is possible to prevent the adhesive Ad from wet-spreading to the side of the drive wiring lines. At the same time, the contact area between the adhesive Ad and the connection pads 70a and 70b increases and the contact area between the adhesive Ad and the cover insulating layer 44d increases, and also a high anchor effect can be obtained by the recesses. Therefore, the strength of adhesion of the adhesive Ad to the connection pads is further improved.

Further, according to this embodiment, the second cover layers 44e functioning as a dam is provided in the peripheral portion of the second recess 74c and the peripheral portion of the second connection pad 70b, and with this structure, the second cover layer 44e can stop the conductive adhesive Ad, thereby making it possible to further reliably prevent the leakage thereof to the side of the drive wiring lines 45b. Thus, the electrical short-circuiting and the mechanical effect, which may be caused by the wet-spreading of the conductive adhesive can be avoided, thereby improving the product yield of the device.

As described above, according to the present embodiment, a head suspension assembly and a disk device, with high connection strength of the piezoelectric element and improved reliability, can be obtained.

Third Embodiment

Figure 10:
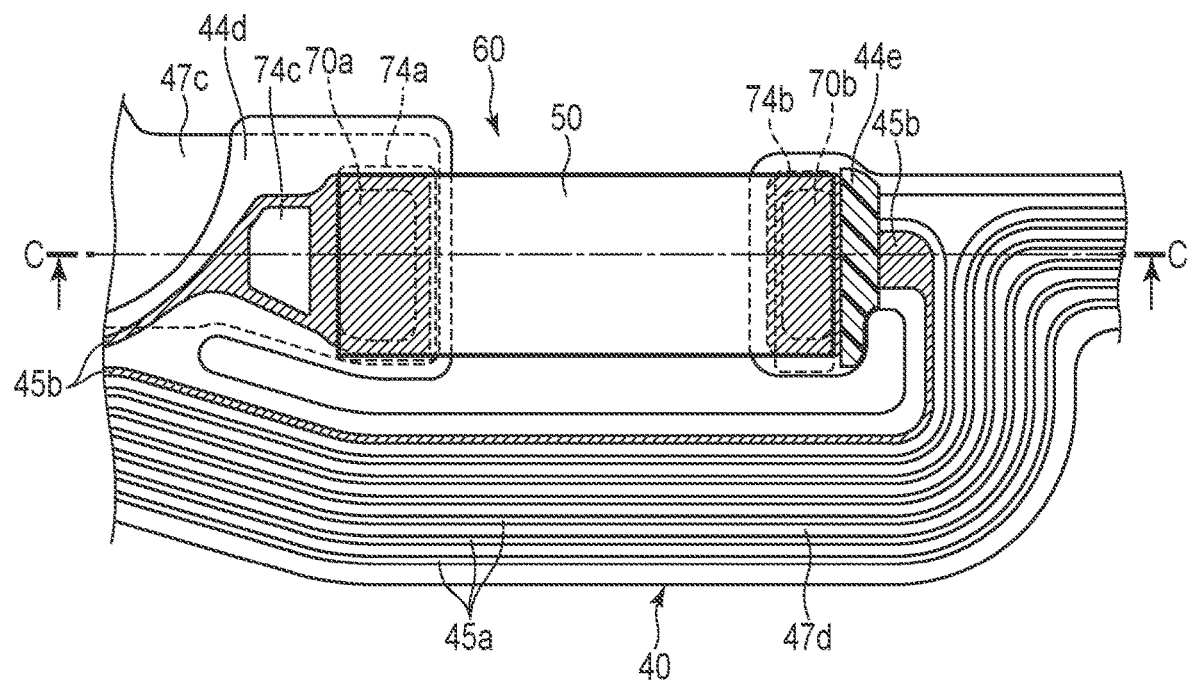
FIG. 10 a plan view showing a pad portion and a piezoelectric element of an HDD according to a third embodiment.
Figure 11:
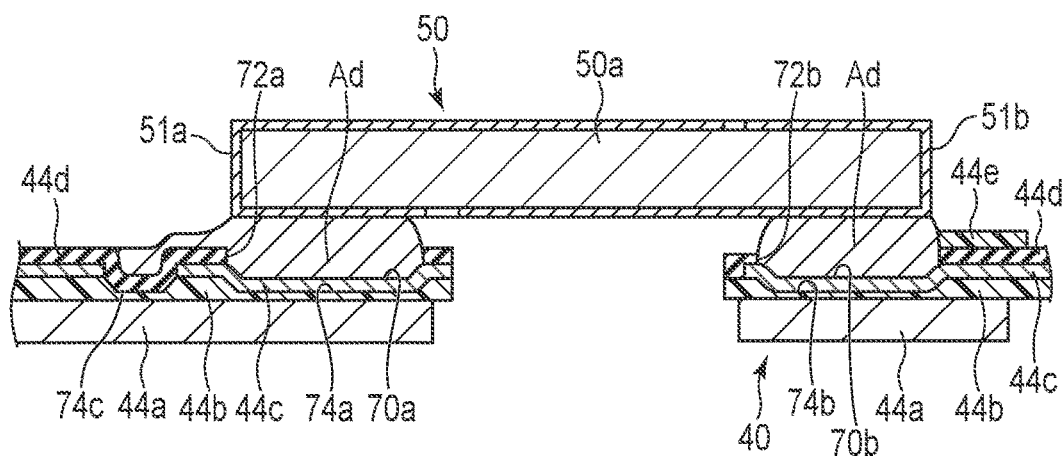
FIG. 11 is a cross-sectional view of the pad portion and the piezoelectric element, taken along line C-C in FIG. 10.

FIG. 10 is a plan view of a mounting portion of a head suspension assembly according to a third embodiment, on which a piezoelectric element is mounted, and FIG. 11 is a cross-sectional view of the mounting portion and the piezoelectric element, taken along line C-C in FIG. 10.

As shown, in the mounting portion 60 of the flexure 40, the base insulating layer 44b further comprises a second recess 74c provided in the vicinity of at least one of the first connection pad 70a and the second connection pad 70b. According to the third embodiment, the second recess 74c is provided on a side of the drive wiring lines 45b with respect to the first connection pad 70a, that is, an opposite side to the second connection pad 70b, in the vicinity of the first connection pad 70a. For example, the second recess 74c is formed into a rectangular shape and is arranged substantially parallel to the recess (a first recess) 74a with a gap therebetween. The second recess 74c has a length shorter than that of the recess 74a and a width about a half of that of the recess 74a. The second recess 74c is formed by, for example, half-etching a predetermined site of the base insulating layer 44b.

Note that the number of the second recesses 74c of the base insulating layer 44b is not limited to singular, but there may be recesses divided into plural. The shape of the second recess 74c is noted limited to rectangular, but may be selected from various ways.

The conducting layer 44c which forms the first connection pad 70a and the drive wiring lines 45b is provided around the second recess 74c without overlapping the second recess 74c. That is, the conducting layer 44c is stacked on the base insulating layer 44b in a position off from the second recess 74c. The cover insulating layer 44d is formed to be overlaid on the second recess 74c and the overlaying region recesses along the second recess 74c as to as form a recess. In this case, conducting layer 44c is not present in the second recess 74c, and therefore the recess formed in the cover insulating layer 44d is formed deeper by the thickness of the conducting layer 44c. In the third embodiment, the second cover layer 44e on the first connection pad 70a side is omitted.

In the mounting portion 60, the recess 74b on the side of the second connection pad 70b and the second cover layer 44e have structures similar to those of the first embodiment previously described, but such a structure may as well do that the second recess 74c is further provided as in the case of the first connection pads 70 side, and only the cover insulating layer 44d is formed to be overlaid on the second recess 74c.

The piezoelectric element 50 is placed on the mounting portion 60 in the state where one longitudinal end (the first electrode 51a) of the piezoelectric main body 50a opposes the first connection pad 70a, and the other longitudinal end (the second electrode 51b) thereof opposes the second connection pad 70b. Between the first connection pad 70a and the first electrode 51a, a conductive adhesive Ad is filled. The first electrode 51a is electrically and mechanically connected to the first connection pad 70a by the conductive adhesive Ad. Here, the conductive adhesive Ad is filled in an opening 72a of the cover insulating layer 44d and a recess (recessed portion) of the first connection pad 70a, formed along the recess 74a and is adhered on the surface of the first connection pad 70a and the inner surface (the cover insulating layer 44d) of the opening 72a. A part of the conductive adhesive Ad flows on the cover insulating layer 44d and it is filled in the recess of the cover insulating layer 44d, which corresponds to the second recess 74c.

Between the second connection pad 70b and the second electrode 51b, the conductive adhesive Ad is filled. The second electrode 51b is electrically and mechanically connected to the second connection pad 70b by the conductive adhesive Ad. Here, the conductive adhesive Ad is filled in an opening 72b of the cover insulating layer 44d and a recess (recessed portion) of the second connection pad 70b, formed along the recess 74b and is adhered on the surface of the second connection pad 70b and the inner surface (the cover insulating layer 44d) of the opening 72b. Further, the conductive adhesive Ad is adhered in the end edge of the second cover layer 44e, and at the same time, it is stopped and regulated by the second cover layer 44e from leaking to the side of the drive wiring lines 45b.

According to the head suspension assembly of the HDD of this embodiment configured as described above, in the mounting portion 60 of the flexure 40 on which the piezoelectric element 50 is mounted, the first connection pad 70a and the second connection pad 70b are formed respectively on the recesses 74a and 74b made in the base insulating layer 44b, so as to make the connection pads into a recessed shape, and thus the adhesive Ad can be sufficiently contained and kept on the connection pads 70a and 70b. With this structure, even if a just sufficient amount of the adhesive Ad to avoid lacking thereof and to secure the strength of adhesion and conductivity, it is possible to prevent the adhesive Ad from wet-spreading to the side of the drive wiring lines. In the side of the first connection pad 70a, a part of the conductive adhesive Ad flows on the cover insulating layer 44d and it is filled in the recess of the cover insulating layer 44d, which corresponds to the second recess 74c. Here, only the cover insulating layer 44d is formed to be overlaid on the second recess 74c, and therefore the recess of the cover insulating layer 44d, which corresponds to the second recess 74c is formed deeply and can contain a more amount of the adhesive and stop the adhesive by the side wall portion of the recess. Therefore, even if a more amount of conductive adhesive Ad is filled on the side of the first connection pad 70a, it is possible to prevent the adhesive Ad from wet-spreading to the side of the drive wiring lines. At the same time, the contact area between the adhesive Ad and the connection pads 70a and 70b increases and the contact area between the adhesive Ad and the cover insulating layer 44d increases, and also a high anchor effect can be obtained by the recesses. Consequently, the strength of adhesion of the adhesive Ad to the connection pads is further improved.

Further, on the side of the second connection pad 70b, the second cover layer 44e functioning as a dam can stop the conductive adhesive Ad, thereby making it possible to prevent the leakage thereof to the side of the drive wiring lines 45b.

As described above, the electrical short-circuiting and the mechanical effect, which may be caused by the wet-spreading of the conductive adhesive can be avoided, thereby improving the product yield of the device. According to this embodiment, a head suspension assembly and a disk device, with high connection strength of the piezoelectric element and improved reliability, can be obtained.

Fourth Embodiment

Figure 12:
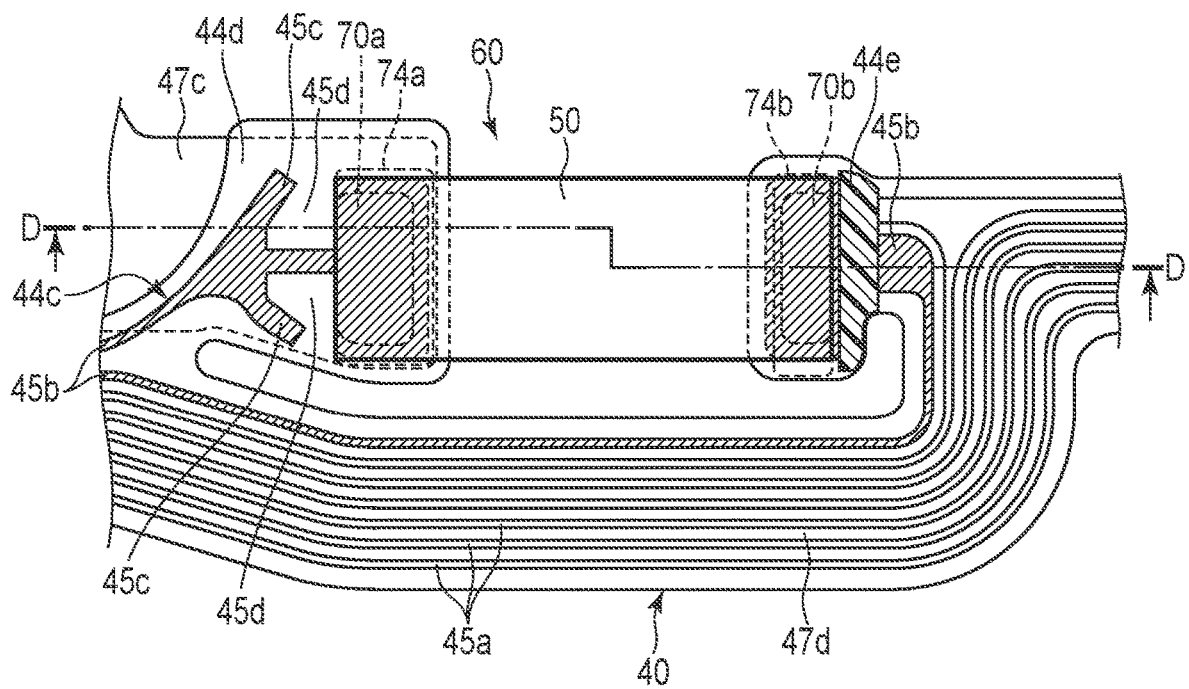
FIG. 12 a plan view showing a pad portion and a piezoelectric element of an HDD according to a fourth embodiment.
Figure 13:
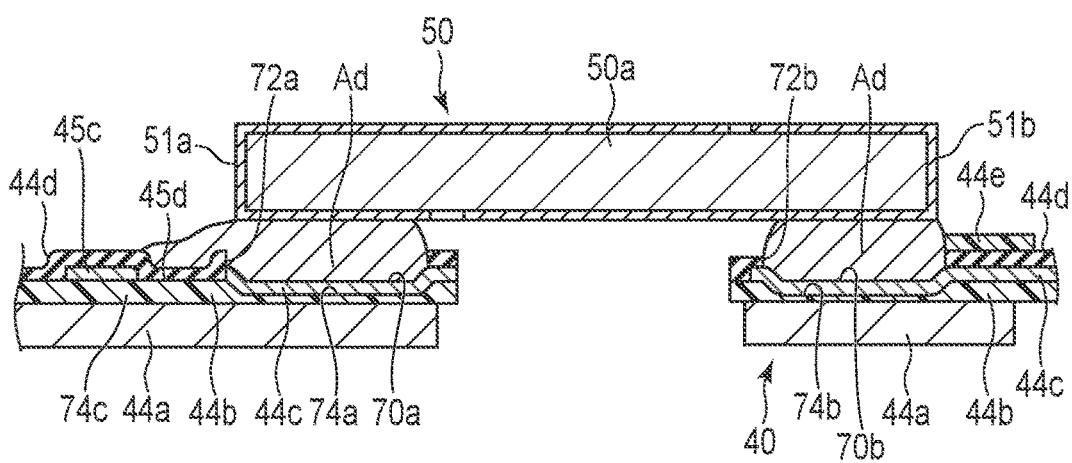
FIG. 13 is a cross-sectional view of the pad portion and the piezoelectric element, taken along line D-D in FIG. 12.

FIG. 12 is a plan view of a mounting portion of a head suspension assembly according to a fourth embodiment, on which a piezoelectric element is mounted, and FIG. 13 is a cross-sectional view of the mounting portion and the piezoelectric element, taken along line D-D in FIG. 12.

As shown, in the mounting portion 60 of the flexure 40, for example, the conducting layer 44c comprises a rectangular first connection pad 70a and a belt-shaped drive wiring lines 45b connected to the first connection pad 70a. According to this embodiment, the drive wiring lines 45b include a pair of extending portions 45c extending from the drive wiring line 45b in both directions of the width thereof and in the direction of the first connection pad 70a, which are integrated as one body. The extending portions 45c oppose one side edge of the first connection pad 70a with a gap therebetween. Thus, between the one side edge of the first connection pad 70a and each extending portion 45c, and on both lateral sides of the drive wiring lines 45b, recesses 45d are formed, respectively.

Note that the shape of the extending portions 45c is not limited to a belt-shaped or linear, but it may be curved or turned into a coil.

The cover insulating layer 44d is stacked on the base insulating layer 44b to be overlaid on the recess 45d and the drive wiring lines 45b. In the cover insulating layer 44d, the region overlaid on the recess 45d forms a recess by recessing along the recess 45d. A region of the cover insulating layer 44d, which overlap the drive wiring lines 45b and the extending portion 45c forms a projection against the recess 45d. The projection functions as a dam which regulates the spreading of the conductive adhesive.

In the fourth embodiment, the second cover layer 44e on the side of the first connection pad 70a is omitted. The other structure of the mounting portion 60 is the same as that of the mounting portion 60 in the first embodiment described before.

The piezoelectric element 50 is placed on the mounting portion 60 in the state where one longitudinal end (the first electrode 51a) of the piezoelectric main body 50a opposes the first connection pad 70a, and the other longitudinal end (the second electrode 51b) thereof opposes the second connection pad 70b. Between the first connection pad 70a and the first electrode 51a, a conductive adhesive Ad is filled. The first electrode 51a is electrically and mechanically connected to the first connection pad 70a by the conductive adhesive Ad. Here, the conductive adhesive Ad is filled in an opening 72a of the cover insulating layer 44d and a recess (recessed portion) of the first connection pad 70a, formed along the recess 74a and is adhered on the surface of the first connection pad 70a and the inner surface (the cover insulating layer 44d) of the opening 72a. A part of the conductive adhesive Ad flows on the cover insulating layer 44d and it is filled in the recess of the cover insulating layer 44d, which corresponds to the recess 45c. At the same time, the conductive adhesive Ad is stopped by the projecting portions of the cover insulating layer 44d overlapping the extending portions 45c and thus regulated from leaking out to the side of the drive wiring lines 45b.

The conductive adhesive Ad is filled between the second connection pad 70b and the second electrode 51b. The second electrode 51b is electrically and mechanically connected to the second connection pad 70b by the conductive adhesive Ad. The conductive adhesive Ad is filled in an opening 72b of the cover insulating layer 44d and a recess (recessed portion) of the second connection pad 70b, formed along the recess 74b and is adhered on the surface of the second connection pad 70b and the inner surface (the cover insulating layer 44d) of the opening 72b. Further, the conductive adhesive Ad is adhered to the end edge of the second cover layer 44e, and at the same time, it is stopped and regulated by the second cover layer 44e from leaking out to the side of the drive wiring lines 45b.

According to the head suspension assembly of the HDD of this embodiment configured as described above, in the mounting portion 60 of the flexure 40 on which the piezoelectric element 50 is mounted, the first connection pad 70a and the second connection pad 70b are formed respectively in the recesses 74a and 74b made in the base insulating layer 44b, so as to make the connection pads into a recessed shape, and thus the adhesive Ad can be sufficiently contained and kept on the connection pads 70a and 70b. With this structure, even if a just sufficient amount of the adhesive Ad to avoid lacking thereof and to secure the strength of adhesion and conductivity, it is possible to prevent the adhesive Ad from wet-spreading to the side of the drive wiring lines. Further, in the side of the first connection pad 70a, a projection and a recess are formed in the cover insulating layer 44d by the extending portions 45c extending from the drive wiring lines 45b, and a part of the conductive adhesive Ad can be filled and contained in the recess. At the same time, the projection can serve as a dam to stop the conductive adhesive Ad, thereby making it possible to prevent the adhesive Ad from wet-spreading to the side of the drive wiring lines.

As described above, according to the fourth embodiment, the electrical short-circuiting and the mechanical effect, which may be caused by the wet-spreading of the conductive adhesive can be avoided, thereby improving the product yield of the device. In this embodiment as well, a head suspension assembly and a disk device, with high connection strength of the piezoelectric element and improved reliability, can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the embodiments provided above, a pair of piezoelectric elements 50 are mounted to the gimbal portion 36 so as to be located in the proximal end portion of the load beam 35 with respect to the magnetic head 17, but the structure is not limited to this. Such a configuration will do that, for example, a pair of piezoelectric elements are placed on respective lateral sides of the support member (the tongue portion) which supports the magnetic head, so as to be arranged along the magnetic head. The number of piezoelectric elements is not limited to a pair but it may be, for example, singular. The shape of the connection pads is not limited to rectangular, but may be selected from various kinds such as elliptical, circular, polygonal and the like.

In the embodiments, the connection pads in the mounting portion 60 are not limited to at least two pads. For example, each of the first connection pad and the second connection pad may be divided into two or more pads.

What is claimed is:
1. A head suspension assembly comprising:
a support plate;
a wiring member disposed on the support plate;
a head mounted on the wiring member; and
an expandable/contractable piezoelectric element mounted on the wiring member, the wiring member comprising:
- a metal plate fixed to the support plate; and
- a multilayered member comprising a first insulating layer, a conducting layer stacked on the first insulating layer, a second insulating layer stacked on the first insulating layer and the conducting layer, the conducting layer including at least two of connection pads and a plurality of wiring lines connected to the connection pads, each of the connection pads being overlaid on a recess formed in the first insulating layer, so as to form a recessed portion along the recess, and the second insulating layer comprising an opening opposing each of the connection pads, and the piezoelectric element being connected to the connection pads by a conductive adhesive filled in the openings and the recessed portions of the connection pads.

2. The head suspension assembly of claim 1, wherein
the first insulating layer comprises a second recess disposed by a side of the recess with an interval therebetween,
the conducting layer and the second insulating layer are stacked to be overlaid on the second recess, and
a part of the conductive adhesive is filled in a recess formed along the second recess in the second insulating layer.

3. The head suspension assembly of claim 2, wherein
the wiring member comprises a second cover layer provided to be overlaid on the second insulating layer in a vicinity of the second recess, so as to dam up and stop the conductive adhesive.

4. The head suspension assembly of claim 1, wherein
the first insulating layer comprises a second recess disposed by a side of the recess with an interval therebetween,
the conducting layer is stacked on the first insulating layer in a position off from the second recess,
the second insulating layer is stacked on the first insulating layer and the conducting layer so as to be overlaid on the second recess, and
a part of the conductive adhesive is filled in a recess formed along the second recess in the second insulating layer.

5. The head suspension assembly of claim 1, wherein
the wiring member comprises a second cover layer provided to be overlaid on the second insulating layer in a vicinity of the opening, so as to dam up and stop the conductive adhesive.

6. The head suspension assembly of claim 1, wherein
at least one of the plurality of wiring lines, which are connected to the connection pads comprises an extending portion integrated as one body, extending from the wiring lines and opposing one side edge of the connection pad with a gap therebetween,
the second insulating layer is stacked on the first insulating layer so as to be overlaid on the wiring lines and the extending portion, and
a part of the conductive adhesive is filled in a recess formed in the second insulating layer along a recess between the extending portion and the connection pad.

7. A disk device comprising:
a disk-shaped recording medium comprising a magnetic recording layer; and
a head suspension assembly of claim 1, which supports a magnetic head.

8. The disk device of claim 7, wherein
the first insulating layer comprises a second recess disposed by a side of the recess with an interval therebetween,
the conducting layer and the second insulating layer are stacked to be overlaid on the second recess, and
a part of the conductive adhesive is filled in a recessed portion formed along the second recess in the second insulating layer.

9. The disk device of claim 8, wherein
the wiring member comprises a second cover layer provided to be overlaid on the second insulating layer in a vicinity of the second recess, so as to dam up and stop the conductive adhesive.

10. The disk device of claim 7, wherein
the first insulating layer comprises a second recess disposed by a side of the recess with an interval therebetween,
the conducting layer is stacked on the first insulating layer in a position off from the second recess,
the second insulating layer is stacked on the first insulating layer and the conducting layer so as to be overlaid on the second recess, and
a part of the conductive adhesive is filled in a recess formed along the second recess in the second insulating layer.

11. The disk device of claim 7, wherein
the wiring member comprises a second cover layer provided to be overlaid on the second insulating layer in a vicinity of the opening, so as to dam up and stop the conductive adhesive.

* * * * *